Oct. 25, 1932.  D. K. WARNER  1,884,429

FOOD FREEZING

Filed April 4, 1931

INVENTOR:
Douglas K. Warner
BY

Patented Oct. 25, 1932

1,884,429

UNITED STATES PATENT OFFICE

DOUGLAS K. WARNER, OF WATKINS GLEN, NEW YORK

FOOD FREEZING

Application filed April 4, 1931. Serial No. 527,723.

This invention relates to the quick freezing of food or other articles by exposure to very high vacuum, and by partial evaporation of the liquid in the food or of water mixed with or sprayed over the food.

An object of the apparatus is to provide a quick freezing apparatus which is not only most economical to operate and simple but able to materially increase the quality of the food.

This and other objects I attain by means of an apparatus embodying the features herein described, and illustrated in the drawings accompanying this application.

In the drawing I have illustrated diagrammatically, partially in section and partially in elevation a refrigerating apparatus embodying my invention in which Fig. 1 shows the freezing evaporator, compressor and part of the condenser. Fig. 2 shows a solid food freezer glass enclosed and Fig. 3 a liquid food freezer and Fig. 4 a view of Fig. 3 as seen from a point above.

The apparatus consists of a refrigerating chamber with a detachable bottom, a powerful steam jet, preferably of the adjustable ring type described in my patent application Ser. No. 526290, a vapor compressor and a condenser.

Referring to Fig. 1 the evaporating refrigerator is shown as A. It has a detachable bottom B which is raised by air pressure in cylinder E the force being transmitted thru rod D to foot C. After the bottom is raised to position with its food supply to be frozen live steam from pipe V is admitted thru valve M to ejector N and valve L is opened to suck most of the air from the evaporator A. This is done to prevent a large amount of air reaching the main condenser and putting it and other apparatus exhausting into it out of commission. The large gate valve H is then opened and the balance of the air exhausted to the condenser J. Valves L and M are then closed and steam turned into the high vacuum expansion nozzles F and blown thru the evaporator and compressor G to condenser J.

Fig. 2 shows a section of the evaporator loaded with berries or other fruit to be frozen. 5 is a glass cylinder attached to the body of the evaporator. Y is a rubber trough fitting snugly about the glass and filled with water to seal the joint and prevent air leakage into the evaporator. Any water leaking thru the joint will have a tendency to freeze and stop the leak. A similar water seal joint is provided by a circular recess in the bottom B to seal the joint when the bottom is raised to position. Some elastic material is of course provided between the glass and the metal. Tank S is filled with water, fresh, sweetened, or salted as desired to flavor the product to be frozen. As soon as the ejector F is started valve U is opened and a shower and spray of water issues from nozzle Z and wets all the surface of the product to be frozen.

Valve U is closed and the water evaporates from the surface of the food thereby freezing the latter. When the initial coating of water is gone another shower is admitted to rewet the product and this process is continued until the food is frozen thruout. Each time the food is wetted a thin film of ice is formed over every pore in the food in intimate contact with every microscopic irregularity of the surface. The evaporation of this ice lowers its temperature and because of the intimate contact between the ice and the food the freezing of the food takes place more rapidly than where extremely low temperatures are available a short distance away from the food. A temperature of 15 degrees F. is therefore better than −50° otherwise used in quick freezing. This difference in temperature reduces the power required to a small fraction of that normally required and also makes possible the use of the cheap and efficient single stage steam ejector.

When the food is finally frozen and additional wetting is given it to thoroughly coat it with ice and thus prevent the air from getting back into the food after it is taken from the vacuum.

It will be seen that the food can loose no moisture by this method of freezing since it is always coated with other moisture and where flavoring is desired such as additional salt or sugar it is very evenly distributed by spraying its solution.

Where it is desired to freeze ice cream, orange juice or other liquids an apparatus such as Fig. 3 is used. In this case juice or cream mix is dumped in S and valve U left open as soon as the freezing vacuum is attained in A. Spray nozzle W is directed upwards and issues an extremely fine spray due to the atmospheric pressure above the juice and the fact that a portion of the liquid bursts into steam on entering due to its temperature being many degrees above the boiling point in this vacuum. The resulting mist is completely frozen before the action of gravity has had time to reverse its direction and let it fall to plate P. Plate P is pierced with openings O shown in Fig. 4 to the bottom of which paper cups R have been attached to be filled with the frozen mist. An excess amount of product is frozen and permitted to cover the plate P and when the bottom is lowered the plate with the cups are withdraw and a new set inserted. The excess product is scraped into the cups. It may be desirable at times to admit the liquid faster than the ejector can remove the vapors to freeze it all so that the product will be slightly moist and more easily packed. It is assumed however that the product will be sufficiently frozen so that its quality will not be impaired by a subsequent slow freezing in the hardening room as is possible with ice cream when it is poured from a commercial freezer in a very liquid state.

It is very necessary that all this apparatus be maintained air tight and also be quickly and easily opened up and closed and reoperated. With this in view the special seals at X are provided as well as similar seals on the valve stuffing boxes as at H. At the center of the packing in gland 7 a pipe 8 leads to an oil cup 6. Any leakage into the valve will consist of low volatile oil which will not add to the condenser load. The valve H is installed at the further end of the narrow section of the compressor where the steam velocity has begun to reduce but the pipe still small enough to economically provide a valve so that the condenser may operate steadily while the frozen product is being removed from one evaporator a series of which may be located around one condenser head so that the operator may move from one freezer to the next in continuous rotation removing the product.

It is evident that plate P of Fig. 3 may be eliminated if square boxes replace the cups shown and also that the frozen juice may be washed out of the evaporator thru a barometric leg with very sweet water just as frozen brine is washed out with a denser brine in application Ser. No. 526,290.

What I claim is:

1. A method of freezing food by surface evaporation which consists in intermittently spraying the surface of the food with water while the food is exposed to a relatively high vacuum.

2. A method of treating food to be frozen by surface evaporation in a relatively highly evacuated chamber which consists in intermittently spraying the surface of the food with a water solution containing flavoring elements, evaporating water from the solution to produce freezing and leaving the flavors on the food.

3. A method of freezing food by surface evaporation in a relatively highly evacuated chamber which consists in intermittently spraying the surface of the food with water and evaporating the water until the food is uniformly frozen and then of continuing to spray it to build up a protective coating of ice on the surface of the food.

4. A method of freezing food by surface evaporation which consists in wetting the surface of the food with an aqueous fluid and evaporating the fluid while the food is exposed to a relatively high vacuum.

In testimony whereof I affix my signature.

DOUGLAS K. WARNER.